C. W. STARKER AND G. L. S. KRONFELD.
GEAR CASE AND METHOD OF FORMING SAME.
APPLICATION FILED NOV. 12, 1915.

1,305,019.

Patented May 27, 1919.
3 SHEETS—SHEET 1.

WITNESSES:
Fred. A. Lind
O. W. Kennedy

INVENTORS
Charles W. Starker
& Gustav L. S. Kronfeld
BY
Wesley G. Carr
ATTORNEY

C. W. STARKER AND G. L. S. KRONFELD.
GEAR CASE AND METHOD OF FORMING SAME.
APPLICATION FILED NOV. 12, 1915.
1,305,019.
Patented May 27, 1919.
3 SHEETS—SHEET 2.
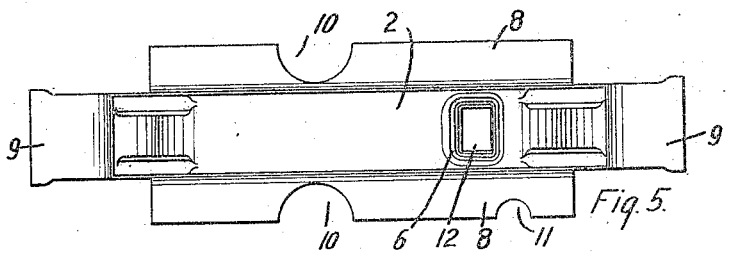
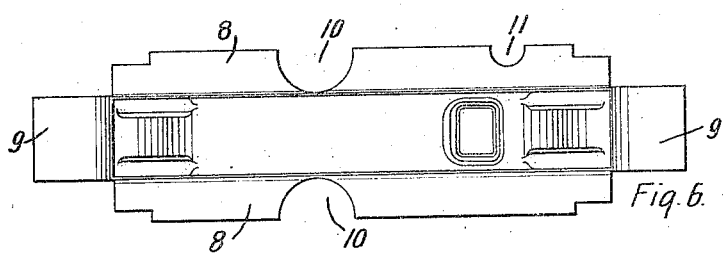
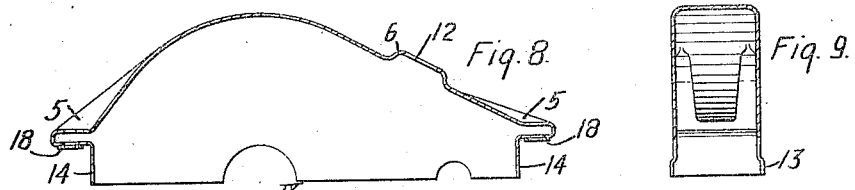
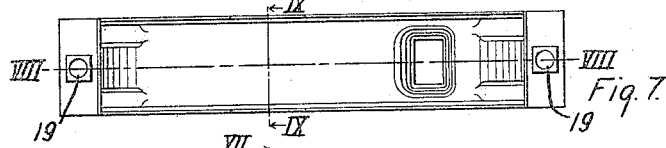
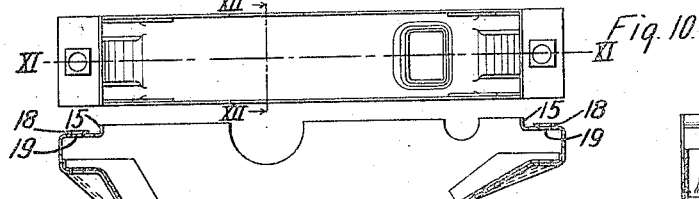
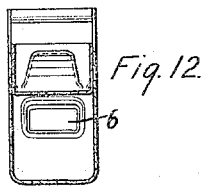
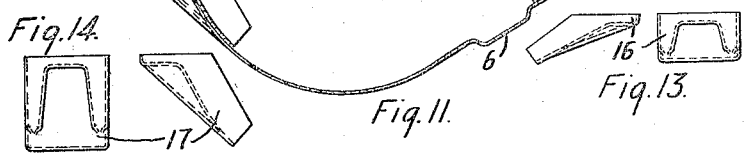
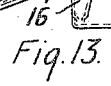
WITNESSES:
Fred. A. Lind.
O. W. Kennedy
INVENTOR
Charles W. Starker
Gustav. L. S. Kronfeld
BY
Wesley G. Carr
ATTORNEY

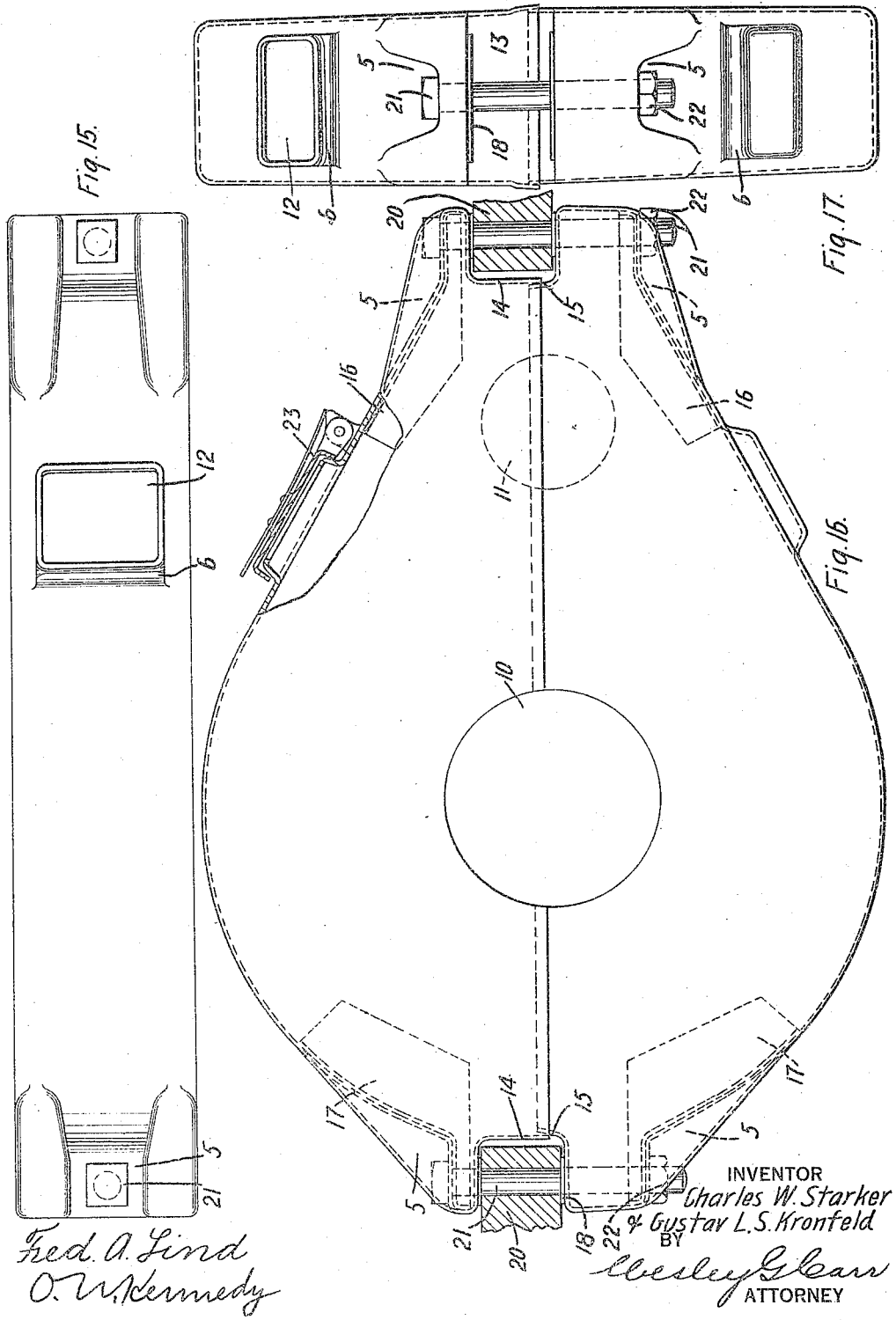

UNITED STATES PATENT OFFICE.

CHARLES W. STARKER, OF PITTSBURGH, AND GUSTAV L. S. KRONFELD, WILKINSBURG, PENNSYLVANIA, ASSIGNORS TO WESTINGHOUSE ELECTRIC AND MANUFACTURING COMPANY, A CORPORATION OF PENNSYLVANIA.

GEAR-CASE AND METHOD OF FORMING SAME.

1,305,019.  Specification of Letters Patent.  Patented May 27, 1919.

Application filed November 12, 1915. Serial No. 61,084.

*To all whom it may concern:*

Be it known that we, CHARLES W. STARKER, a subject of the Emperor of Germany, and a resident of Pittsburgh, in the county of Allegheny and State of Pennsylvania, and GUSTAV L. S. KRONFELD, a subject of the King of Great Britain, and a resident of Wilkinsburg, in the county of Allegheny and State of Pennsylvania, have invented a new and useful Improvement in Gear-Cases and Methods of Forming Same, of which the following is a specification.

Our invention relates to gear cases that are adapted for the protection of the reduction gears which are usually interposed between the motor shafts and the driving axles of electrically propelled vehicles and other machines.

The object of our invention is to provide a light and durable gear case and a simple and convenient method of forming the same that shall effect a considerable reduction in the manufacturing cost, as compared with gear cases heretofore constructed.

The more usual construction of gear cases comprises two similar halves for inclosing the gears, each member being made of cast metal or comprising a number of sheet metal parts riveted or welded together. Cast metal gear cases are relatively heavy and are easily broken, while riveted or welded gear cases are difficult and expensive to manufacture, and, as heretofore constructed, they have exhibited a tendency to leak oil at the joints and to collapse under severe service conditions. According to the present invention, we provide a gear case, each member of which is readily formed by drawing and bending various portions of a suitable sheet-metal blank.

Figure 1:
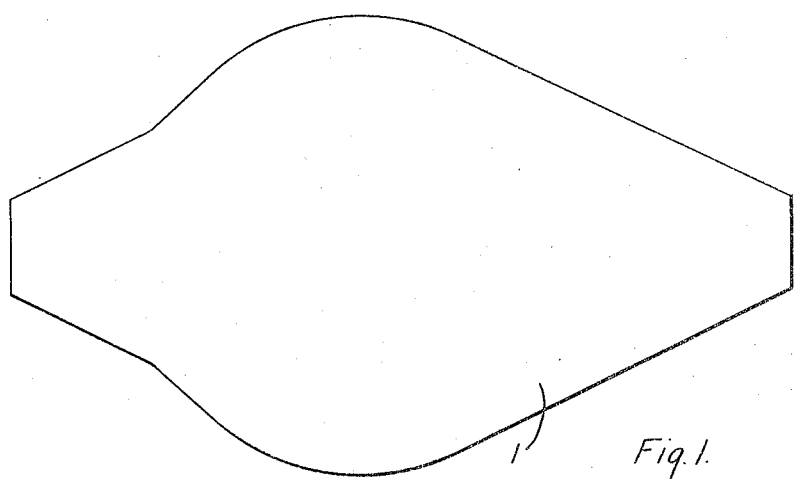
Figure 2:
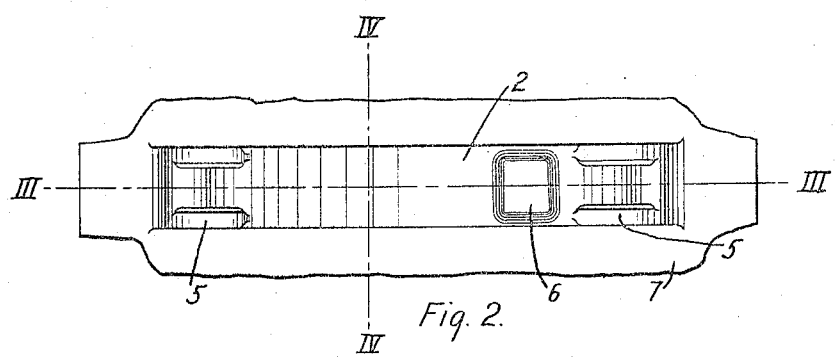
Figure 3:
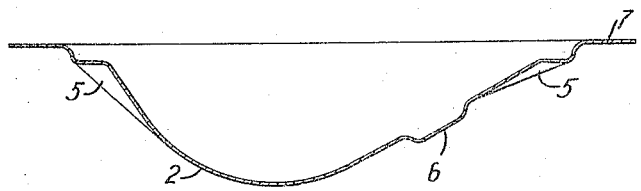
Figure 4:
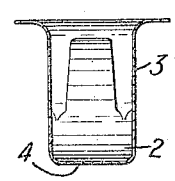

In the accompanying drawings, Figure 1 is a plan view of a sheet-metal blank before being subjected to the first operation in forming a gear case in accordance with our invention; Fig. 2 is a plan view of the blank after the first operation of drawing; Figs. 3 and 4 are longitudinal and transverse sectional views along the lines III—III and IV—IV of Fig. 2, respectively; Fig. 5 is a plan view of a blank for the upper member of a gear case after trimming; Fig. 6 is a plan view of a blank for the lower member of a gear case after trimming; Fig. 7 is a plan view of the upper member of a gear case after the final operations of bending and folding; Figs. 8 and 9 are longitudinal and transverse sectional views, respectively, along the lines VIII—VIII and IX—IX of Fig. 7; Figs. 10, 11 and 12 are views of the lower member of the gear case corresponding to Figs. 7, 8 and 9, respectively; Figs. 13 and 14 are detail views of reinforcing brackets, and Figs. 15, 16 and 17 are plan, side and end views, respectively, of a completely assembled gear case.

In forming a gear case in accordance with our invention, a blank 1 is punched from sheet metal and is preferably shaped as shown in Fig. 1. This particular shape has been found to approximate the most economical form for the blank before the drawing operation, although it is to be understood that the blank may have a somewhat different shape if found desirable. The blank 1 is then placed in a suitable die and a portion thereof is subjected to the action of a drawing punch to form a trough 2. The form of blank, after the drawing operation, is shown clearly in Figs. 2, 3 and 4. The trough 2 is of greatest depth at its middle section and generally comprises side walls 3 and a bottom 4. Substantially similar depressions or pockets 5, the sides of which are slightly convergent, as best shown in Fig. 4, are formed in the bottom 4 adjacent the ends of the trough. A portion of the bottom 4 is also expanded outwardly, as shown at 6, for a purpose that will be hereinafter described. The remaining portion of the blank 1 constitutes a continuous rim or flange 7 that surrounds the trough 2. The flange 7 is retained in the die after the drawing operation and is subjected to the action of a suitable stamp or trimming punch.

In forming the upper and lower members of a gear case, the flanges 7 are trimmed, as shown in Figs. 5 and 6, respectively. In each case, the blank then comprises the trough 2 and similar oppositely disposed wing portions 8—8 and 9—9 which extend substantially at right angles to the walls 3 of the trough 2. The laterally extending wing portions 8—8 are provided with symmetrically arranged and substantially semi-circular openings 10 and 11, the purpose of which will be hereinafter set forth. The outwardly expanded portion 6 of the upper member shown in Fig. 5 is provided with a rectangular opening 12.

In giving a blank its final form, the laterally extending wing portions 8 are bent upwardly into planes coinciding with the planes of the side walls 3 of the trough 2. The longitudinally extending portions 9 are then folded over, as shown in Figs. 8 and 11, to close portions of the trough 2 above the depressions or pockets 5. The portions 9 are further bent upwardly into engagement with the ends of the side walls formed by the previously bent-up portions 8. The bent-up wall portions 8 of the upper member are slightly off-set, as shown at 13 in Fig. 9, and the bent-up ends 14 of the portions 9 are spaced farther apart than the corresponding ends 15 of the lower member. After the above described bending and folding operations have been completed, the abutting edges of the portions 8 and 9 are joined by welding or other suitable means so that each gear case member forms a substantially unitary structure. Reinforcing brackets 16 and 17, shown in Figs. 13 and 14, respectively, are pressed from sheet metal to conform to the pockets 5 and the adjacent walls of the trough and are welded to each gear-case member. Additional reinforcing plates 18 are secured to the faces of the folded-over portions 9, and openings 19 are provided therein and in the opposite portions of the pockets 5.

The gear-case members are secured to suitable supports 20, such as extensions from the frame of an electric motor, by bolts 21 extending through the openings 19 and nuts 22 coacting therewith, the heads of the bolts 21 and the nuts 22 being located in the pockets 5. A hinged cover 23 of a well known type is adapted to close the opening 12, the function of the opening 12 being to allow inspection of the gearing within the case. The substantially semi-circular openings 10 and 11 together provide suitable openings for the driving axle and the motor shaft. It is apparent that the lower member will fit within the off-set portions 13 and the ends 14 of the upper member so that a gear case constructed in accordance with our invention will be substantially oil and water-tight owing to the absence of any riveted joints and the overlapping portions of the respective members.

While we have described our invention as applied to a particular form of blank and as being produced by a certain number of separately performed operations, it is apparent that certain of the operations may be combined without deviating from the general method and to produce the same result, and we desire that only such limitations shall be imposed thereupon as come within the scope of the appended claims.

We claim as our invention:

1. The method of forming a gear-case member from a sheet-metal blank which consists in drawing a shell from a portion of said blank, trimming the remaining portion of said blank, bending portions of said blank to conform to the walls of said shell and folding over other portions of said blank to close portions of said shell adjacent the ends thereof.

2. The method of forming a gear-case member from a sheet-metal blank which consists in drawing a shell from a portion of said blank, trimming the remaining portion of said blank, bending portions of said blank to conform to the walls of said shell, folding over other portions of said blank to close portions of said shell adjacent the ends thereof and joining together the abutting edges of said folded-over portions and the walls of said shell.

3. The method of forming a gear-case member from a sheet-metal blank which consists in drawing a trough of varying depth from a portion of said blank, trimming the remaining portion of said blank to form a rim surrounding said trough, bending portions of said rim to conform to the walls of said trough, folding over other portions of said rim to close portions of said trough adjacent the ends thereof and joining together the abutting edges of said bent and folded-over portions.

4. The method of forming a gear case from a sheet-metal blank which consists in drawing a trough of varying depth having pockets adjacent the ends thereof from a portion of said blank, trimming the remaining portion of said blank to form a rim surrounding said trough, bending portions of said rim into planes coinciding with the planes of the walls of said trough and folding over other portions of said rim to close the shallow portions of said trough above the said pockets and to form end closures for the said bent portions.

5. The method of forming a gear-case member which consists in drawing and trimming a sheet-metal blank to form a trough having extending wing portions, bending certain of said wing portions to conform to the walls of said trough, folding over other of said wing portions to close portions of said trough adjacent the ends thereof and to provide end closures for the said bent wall portions and welding together the abutting edges of said folded-over portions and the said wall portions.

6. A gear-case member comprising a trough having external pockets adjacent the ends thereof, portions extending over the top of said trough which close the portions of said trough above said pockets.

7. A gear-case member comprising a sheet-metal trough of varying depth and having portions folded over the shallow end portions of the trough.

8. A gear-case member comprising a trough and having portions folded over the end portions of said trough and reinforcing plates positioned in said end portions of the trough and secured thereto.

9. A gear-case member comprising a trough and having portions folded over the end portions of said trough, reinforcing plates positioned in said end portions of the trough and secured thereto, and side walls for said trough extending beyond said end portions.

In testimony whereof, we have hereunto subscribed our names this 30th day of Oct., 1915.

CHARLES W. STARKER.
GUSTAV L. S. KRONFELD.